(12) United States Patent
Chang

(10) Patent No.: US 12,060,049 B2  
(45) Date of Patent: Aug. 13, 2024

(54) APPARATUS AND METHOD OF CHANGING DECELERATION OF BRAKING CURVE BASED ON A VARIATION IN COEFFICIENT OF FRICTION

(71) Applicants: HYUNDAI MOTOR COMPANY, Seoul (KR); KIA CORPORATION, Seoul (KR)

(72) Inventor: Hwi Bong Chang, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 350 days.

(21) Appl. No.: 17/733,084

(22) Filed: Apr. 29, 2022

(65) Prior Publication Data

US 2023/0174031 A1 Jun. 8, 2023

(30) Foreign Application Priority Data

Dec. 8, 2021 (KR) .................. 10-2021-0175004

(51) Int. Cl.
- *B60T 8/1763* (2006.01)
- *B60T 8/171* (2006.01)
- *B60T 8/172* (2006.01)

(52) U.S. Cl.
CPC ............ *B60T 8/1763* (2013.01); *B60T 8/171* (2013.01); *B60T 8/172* (2013.01); *B60T 2210/12* (2013.01); *B60T 2250/02* (2013.01)

(58) Field of Classification Search
CPC ........ B60T 8/1763; B60T 8/171; B60T 8/172; B60T 2210/12; B60T 2250/02; B60T 8/321; B60T 2270/60; B60W 40/105; B60W 10/18; B60W 30/18127; B60W 40/068; B60W 2520/10; B60W 2552/40
USPC ........................................... 701/70
See application file for complete search history.

(56) References Cited

U.S. PATENT DOCUMENTS

| | | |
|---|---|---|
| 2013/0187442 A1 | 7/2013 | Kong |
| 2016/0039292 A1* | 2/2016 | Takahashi ....... B60W 30/18109 701/70 |

FOREIGN PATENT DOCUMENTS

KR  10-2013-0086440 A  8/2013

* cited by examiner

*Primary Examiner* — Yi-Kai Wang  
(74) *Attorney, Agent, or Firm* — MORGAN, LEWIS & BOCKIUS LLP (57) ABSTRACT

An apparatus of changing deceleration of a braking curve based on a variation in a coefficient of friction may include: a coefficient-of-friction calculating unit calculating a first coefficient of friction between a brake disk and a friction material at a first point in time, and calculating a second coefficient of friction between the brake disk and the friction material at a second point in time at which a preset driving distance has elapsed from the first point in time; a determination unit determining whether there is a change in coefficient of friction between the first coefficient of friction and the second coefficient of friction; and a deceleration changing unit changing deceleration by regenerative braking or deceleration by hydraulic braking from a preset braking curve by an amount of a variation in deceleration according to the variation in coefficient of friction, when there is a variation in coefficient of friction.

20 Claims, 4 Drawing Sheets

APPARATUS AND METHOD OF CHANGING DECELERATION OF BRAKING CURVE BASED ON A VARIATION IN COEFFICIENT OF FRICTION

CROSS-REFERENCE TO RELATED APPLICATION(S)

The present application claims the benefit of priority to Korean Patent Application No. 10-2021-0175004 filed on Dec. 8, 2021 in the Korean Intellectual Property Office, the entire disclosure of which is incorporated herein by reference.

TECHNICAL FIELD

The present disclosure relates to an apparatus and a method of changing deceleration of a braking curve on a variation in a coefficient of friction.

BACKGROUND

A braking curve is a curve representing deceleration of a vehicle according to a pedal stroke of a brake pedal. When the stroke is commonly determined, a brake controller may cause the vehicle to be braked at deceleration corresponding to a stroke on a braking curve by controlling the brake by producing friction of a friction material against a brake disk with appropriate brake hydraulic pressure. A fixed value is used for a coefficient of friction between the friction material and the brake disc when designing the above-described braking curve or braking hydraulic pressure.

Meanwhile, in the case of environmentally friendly vehicles such as hybrid vehicles or electric vehicles, which have recently been increasing, since a hydraulic braking ratio is lower than that of general internal combustion engine vehicles, a lot of rust may be generated in the brake disc, and such rust may cause noise during braking. Accordingly, a method of forming a nitride layer by nitriding a surface of the brake disc to prevent rust is being considered.

However, if a driving distance is long, it may cause wear of the nitride layer, and a coefficient of friction may increase once again due to wear of the nitride layer. Therefore, even when the brake pedal is depressed with the same stroke, there is a problem in that a vehicle may be braked with a greater amount of deceleration than the deceleration on the initially designed preset braking curve.

The information disclosed in the Background section above is to aid in the understanding of the background of the present disclosure, and should not be taken as acknowledgement that this information forms any part of prior art.

SUMMARY

An aspect of the present disclosure is to provide an apparatus and a method of changing deceleration of a braking curve based on a variation in a coefficient of friction, which can brake a vehicle at a constant deceleration for the same stroke despite the variation in the coefficient of friction.

According to an aspect of the present disclosure, an apparatus of changing deceleration of a braking curve based on a variation in a coefficient of friction, includes: a coefficient-of-friction calculating unit for calculating a first coefficient of friction between a brake disk and a friction material at a first point in time, and calculating a second coefficient of friction between the brake disk and the friction material at a second point in time at which a preset driving distance has elapsed from the first point in time; a determination unit for determining whether there is a variation in a coefficient of friction from the first coefficient of friction and the second coefficient of friction; and a deceleration changing unit for changing deceleration by regenerative braking or deceleration by hydraulic braking from a preset braking curve by an amount equal to a variation in deceleration according to the variation in the coefficient of friction, when it is determined that there is the variation in the coefficient of friction.

According to an aspect of the present disclosure, a method of changing deceleration of a braking curve based on a variation in a coefficient of friction, includes: a first operation of calculating a first coefficient of friction between a brake disk and a friction material at a first point in time, in a coefficient-of-friction calculating unit; a second operation of calculating a second coefficient of friction between the brake disk and the friction material at a second point in time at which a preset driving distance has elapsed from the first point in time, in the coefficient-of-friction calculating unit; a third operation of determining whether there is a variation in a coefficient of friction from the first coefficient of friction and the second coefficient of friction, in a determination unit; and a fourth operation of changing deceleration by regenerative braking or deceleration by hydraulic braking from a preset braking curve by an amount equal to a variation in deceleration according to the variation in the coefficient of friction, when it is determined that there is the variation in the coefficient of friction, in a deceleration changing unit.

According to an aspect of the present disclosure, there is provided a computer-readable storage medium in which a program for executing the method on a computer is recorded.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the present disclosure to those skilled in the art. In the drawings, the same reference numerals will be used throughout to designate the same or like elements, and the shapes and dimensions of elements may be exaggerated for clarity.

Figure 1:
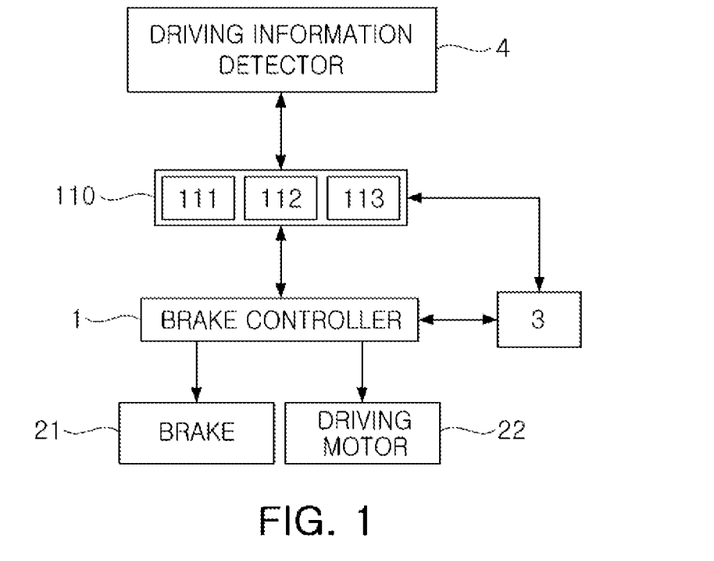
FIG. 1 is a block diagram of an entire system including an apparatus for changing deceleration of a braking curve according to an exemplary embodiment of the present disclosure.

FIG. 1 is a block diagram of an entire system 100 including an apparatus for changing deceleration of a braking curve according to an exemplary embodiment of the present disclosure.

As illustrated in FIG. 1, a driving information detector 4 may transmit information for obtaining a coefficient of friction to an apparatus for changing deceleration 110.

The information for detecting the coefficient of friction may include a weight of a vehicle, deceleration, a pressure of a master cylinder, an area of a friction material, an effective radius and a dynamic radius of a tire.

Thereamong, the deceleration may be measured, for example, through an acceleration sensor, and the pressure of the master cylinder may be measured through a pressure sensor. The weight of the vehicle, the area of the friction material, the effective radius and the dynamic radius of the tire are known values. In addition, the driving information detector 4 may transmit a driving distance measured through a wheel speed sensor and a stroke of a brake pedal measured using a brake pedal sensor to the apparatus for changing deceleration 110.

The apparatus for changing deceleration 110 may include a coefficient-of-friction calculating unit 111, a determination unit, and a deceleration changing unit 113.

Specifically, the coefficient-of-friction calculating unit 111 may calculate a first coefficient of friction between a brake disc and a friction material. Thereafter, a second coefficient of friction between a brake disk and a friction material may be calculated at a second point in time when a preset driving distance has elapsed from a first point in time at which the first coefficient of friction was calculated.

The above-described first point in time may be a point in time at which a driving distance is a preset distance, for example, 100 km, and the above-described second point in time may be a point in time at which a driving distance is 5000 km. It should be noted that the above-described specific values of the driving distance are only for helping understanding of the present disclosure, and the present disclosure is not limited to the above-described specific values.

The above-described first coefficient of friction and second coefficient of friction may be calculated according to Equation 1 below.

$$\mu = \frac{M \times a}{P \times S \times 2 \times \left(\frac{R1}{R2}\right)}$$ [Equation 1]

where μ is a first coefficient of friction or a second coefficient of friction, M is a weight of a vehicle, a is deceleration, P is a pressure in a master cylinder, S is an area of a friction material, R1 is an effective radius of a tire, and R2 is a dynamic radius of a tire.

According to an exemplary embodiment of the present disclosure, the coefficient-of-friction calculating unit 111 may calculate a plurality of first coefficients of friction and a plurality of second coefficients of friction when braking by a preset number of braking operations at a preset initial braking speed.

For example, assuming that the preset initial braking speed is 30 km, and the preset number of braking operations is 10 times, the coefficient-of-friction calculating unit 111 may obtain 10 first coefficients of friction by braking 10 times at an initial braking speed of 30 km at a first point in time, and similarly, 10 second coefficients of friction by braking 10 times at an initial braking speed of 30 km at a second point in time.

Alternatively, the coefficient-of-friction calculating unit 111 may calculate a plurality of first coefficients of friction and a plurality of second coefficients of friction after being braked by a preset number of pre-braking operations.

For example, assuming that the preset initial braking speed is 30 km, the preset number of braking operations is 5 times, and the preset number of braking operations is 5 times, after braking 5 times at an initial braking speed of 30 km at the first time in point and then braking for 5 times thereafter, 5 first coefficients of friction may be obtained, and similarly thereto, after braking 5 times at an initial braking speed of 30 km at the second time in point and then braking for 5 times thereafter, 5 second coefficients of friction may be obtained.

That is, the reason for obtaining the coefficient of friction after being braked by a preset number of pre-braking operations is to remove rust generated on a brake disc due to the vehicle being left unattended for a long period of time.

It should be noted that the specific numerical values of the above-described initial braking speed, the above-described preset number of braking operations, and the above-described preset number of pre-braking operations are provided to aid in an understanding of the present disclosure, and the present disclosure is not limited to the above-described specific numerical values.

Meanwhile, the determination unit 112 may determine whether there is a variation in a coefficient of friction from a first coefficient of friction and a second coefficient of friction.

According to an exemplary embodiment of the present disclosure, the determination unit 112 may determine whether there is a variation in the coefficient of friction based on homogeneity of normal distributions of a plurality of first coefficients of friction and a plurality of second coefficients of friction. Homogeneity is to determine whether two normal distributions are identical or not, which is a method generally used in the field of statistics, and detailed description thereof will be omitted.

Alternatively, according to an exemplary embodiment of the present disclosure, the determination unit 112 may determine there is a variation in the coefficient of friction when a difference between the average value of the plurality of first coefficients of friction and the average value of the plurality of second coefficients of friction is greater than a preset value. It should be noted that the preset value can be appropriately set according to the needs of those skilled in the art, and is not limited to specific values herein.

According to an exemplary embodiment of the present disclosure, if it is determined that there is a variation in the coefficient of friction, the determination unit 112 may notify a driver that a brake disk needs to be replaced by at least one of an acoustic and a visual method. For example, it is possible to output a voice or a text saying "Disk nitride layer is worn, please replace it."

Finally, if it is determined that there is a variation in a coefficient of friction, the deceleration changing unit 113 may change the deceleration by regenerative braking or the deceleration by hydraulic braking from the preset braking curve by an amount equal to a variation in deceleration according to the variation in coefficient of friction. The changed braking curve may be stored in the memory 3.

Here, the amount equal to a variation in deceleration according to the variation in the coefficient of friction may be a difference between the deceleration measured at a first point in time and the deceleration measured at a second point in time. When the coefficient of friction is measured multiple times, it may be a difference between an average value of the plurality of decelerations measured at the first point in time and an average value of the plurality of decelerations measured at the second point in time.

Hereinafter, a process of changing the deceleration of a preset braking curve will be described with reference to FIGS. 2A to 2C, additionally. For better understanding of the present disclosure, a case in which a coefficient of friction and deceleration corresponding thereto increase is exemplarily described below, but it may be equally applied to a case in which a coefficient of friction and deceleration corresponding thereto decrease.

Figure 2A:
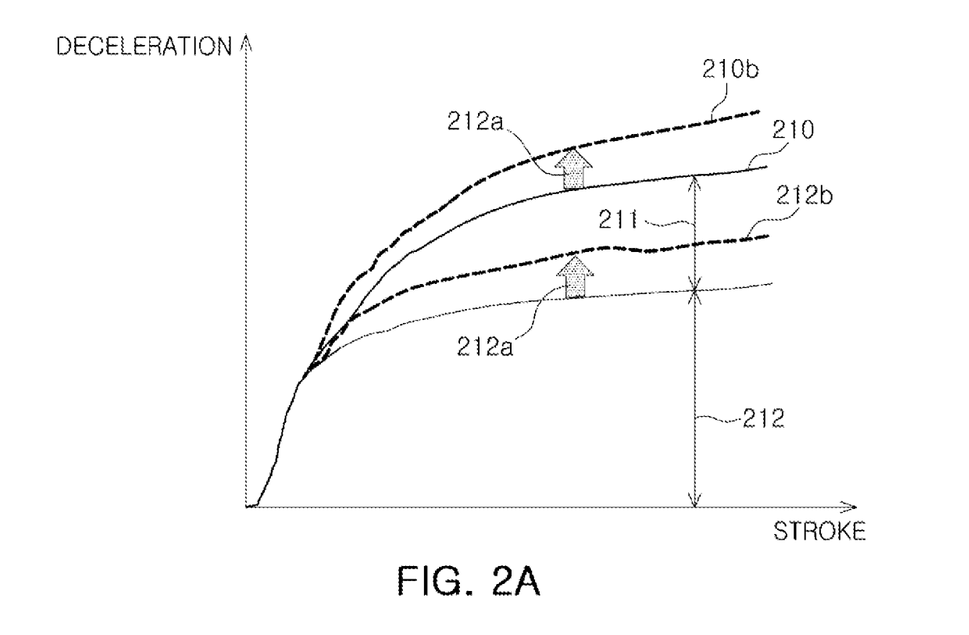
FIGS. 2A, 2B and 2C are diagrams illustrating a change in deceleration according to an exemplary embodiment of the present disclosure.
Figure 2B:
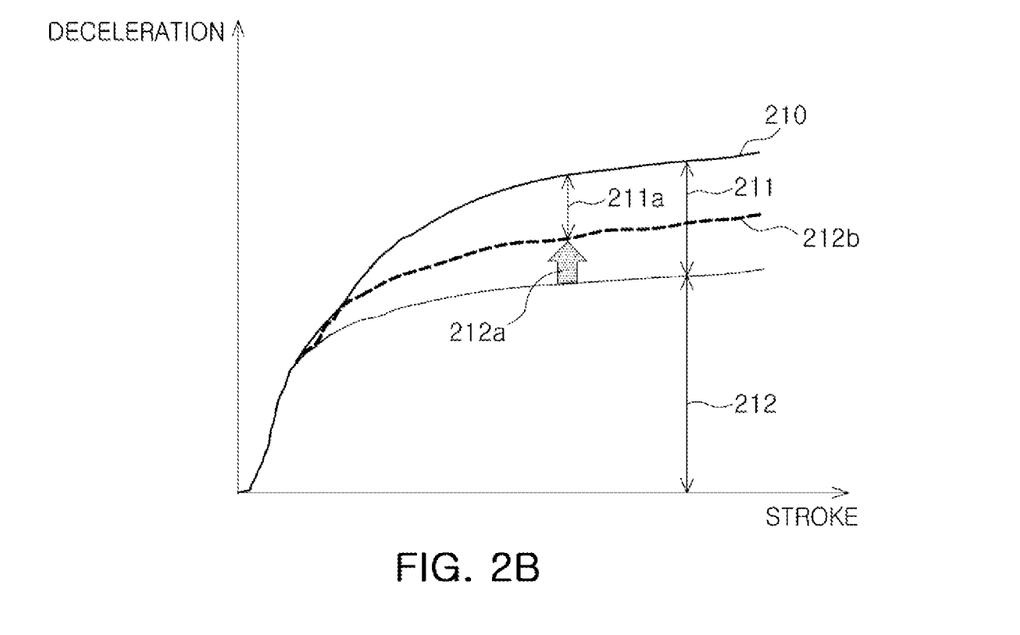
Figure 2C:
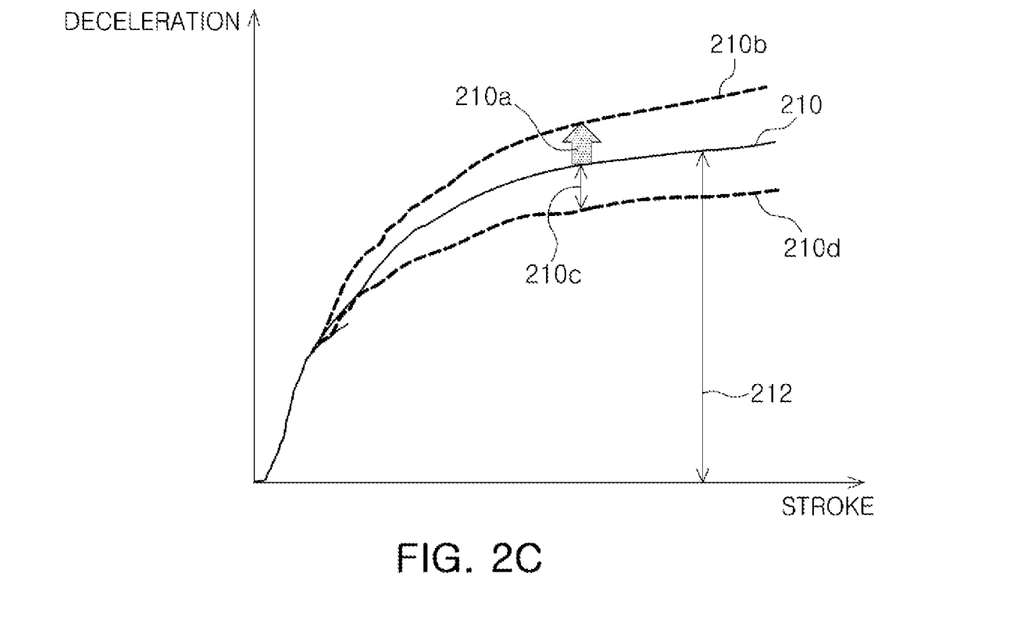

FIGS. 2A, 2B and 2C are diagrams illustrating a change in deceleration of a preset braking curve according to exemplary an embodiment of the present disclosure.

First, FIG. 2A is a diagram illustrating actual deceleration according to a variation in a coefficient of friction.

As illustrated in FIG. 2A, a preset braking curve 210 comprises a sum of deceleration 212 by hydraulic braking and deceleration 211 by regenerative braking compared to a stroke of a brake pedal. For reference, it should be noted that deceleration by the regenerative braking is independent of a coefficient of friction, since hydraulic braking is to brake a vehicle by friction between a brake disc and a friction material, and regenerative braking is to brake the vehicle using a driving motor.

If the coefficient of friction increases, actual deceleration 212b by hydraulic braking increases by an amount equal to an increase in deceleration 212a according to the increase in the coefficient of friction (in this case, the deceleration 211 by regenerative braking is fixed), so the actual deceleration 210b may also increase by the same amount 212a. In this case, there is a problem of being greatly decelerated even when the driver lightly depresses a pedal.

FIG. 2B is a diagram illustrating a change in deceleration according to an exemplary embodiment of the present disclosure, and illustrates a case of braking using both hydraulic braking and regenerative braking.

As illustrated in FIG. 2B, when the preset braking curve 210 comprises the sum of the deceleration 212 by hydraulic braking and the deceleration 211 by regenerative braking compared to the stroke of the brake pedal, the deceleration changing unit 113 may reduce the deceleration 211 by regenerative braking from the preset braking curve 210 by an amount of increase in deceleration 212a according to the variation in the coefficient of friction. The deceleration due to the reduced regenerative braking is indicated by reference numeral 211a, and the actual deceleration due to the hydraulic braking is indicated by reference numeral 212b.

Accordingly, it can be seen that it is possible to brake at deceleration according to the preset braking curve 210 for the same stroke despite the variation in the coefficient of friction.

Meanwhile, FIG. 2C is a diagram illustrating a change of deceleration according to an exemplary embodiment of the present disclosure, and unlike FIG. 2B, FIG. 2C illustrates a case of braking using only hydraulic braking.

As illustrated in FIG. 2C, when the preset braking curve 210 comprises only the deceleration 212 by hydraulic braking compared to the stroke of the brake pedal, the deceleration changing unit 113 may reduce a deceleration value of the preset braking curve 210 by an amount 210c equal to an increase in deceleration 210a according to the variation in the coefficient of friction. The deceleration due to reduced hydraulic braking is indicated by reference numeral 210d.

Accordingly, it can be seen that the vehicle may be braked for the same stroke at the deceleration according to the preset braking curve 210 despite the variation in the coefficient of friction.

Finally, the brake controller 1 may control the brake 21 by forming an appropriate brake hydraulic pressure to brake the vehicle according to the braking curve stored in the memory 3 or generate an appropriate regenerative braking force to control the driving motor 22.

That is, the braking controller 1 may control the brake 21 with an appropriate braking hydraulic pressure according to the deceleration by the changed hydraulic braking with reference to the memory 3, and may control the driving motor 22 with appropriate regenerative braking force according to the deceleration by the changed regenerative braking with reference to the memory 3. It should be noted that the appropriate braking hydraulic pressure or regenerative braking force according to the deceleration can be obtained according to the specifications of the brake or driving motor, and the present disclosure is not limited to specific numerical values.

Meanwhile, according to an exemplary embodiment of the present disclosure, temperature deviation and rainfall deviation at the first point in time at which the first coefficient of friction was calculated and the second point in time at the second point in time at which the second coefficient of friction is calculated may be a value within a preset range. This is to calculate the coefficient of friction in an environment where temperature or rainfall is as similar as possible.

As described above, according to an exemplary embodiment of the present disclosure, when there is a variation in the coefficient of friction, by changing the deceleration by regenerative braking or the deceleration by hydraulic braking from the preset braking curve by the amount equal to a variation in deceleration according to the variation in the coefficient of friction, it is possible to brake the vehicle at a constant deceleration for the same stroke in spite of variations in the coefficient of friction.

Figure 3:
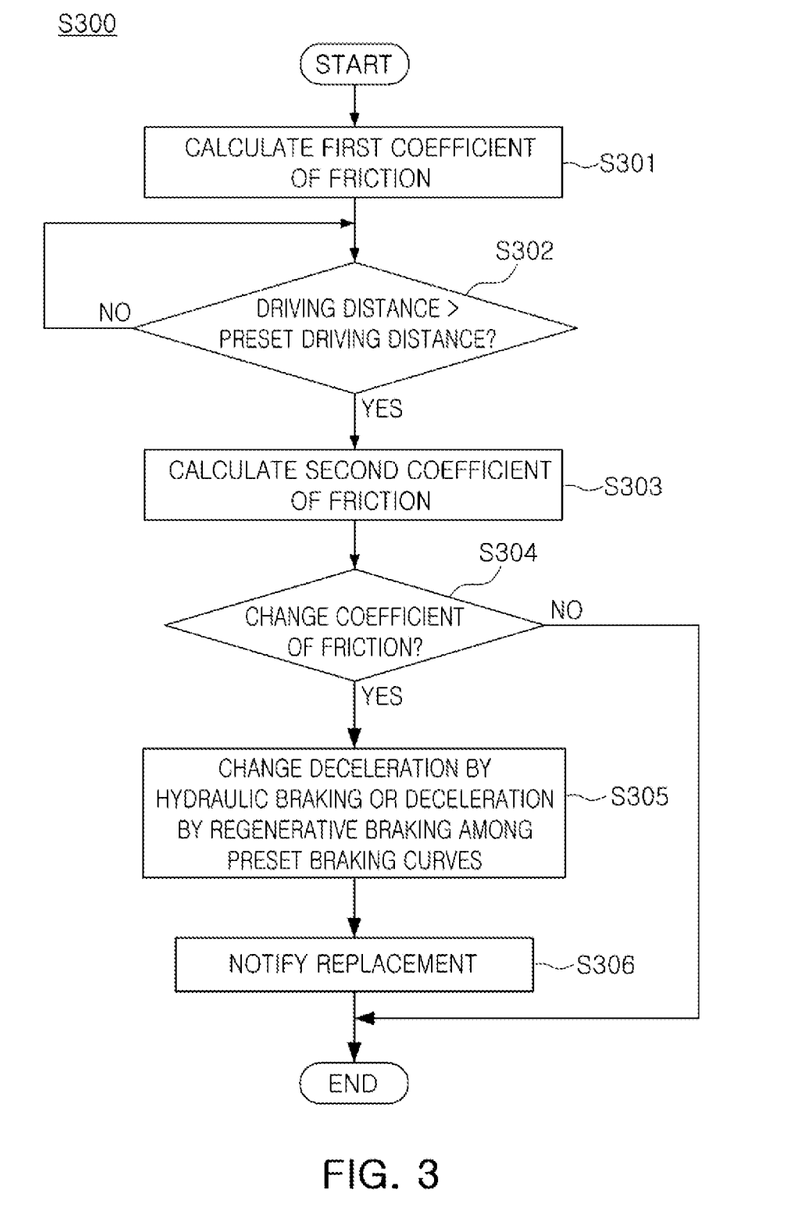
FIG. 3 is a flowchart illustrating a method of changing deceleration of a braking curve according to an exemplary embodiment of the present disclosure.

FIG. 3 is a flowchart illustrating a method of changing deceleration of a braking curve based on a variation in a coefficient of friction according to an exemplary embodiment of the present disclosure.

Hereinafter, a method of changing deceleration of a braking curve based on a variation in a coefficient of friction according to an exemplary embodiment of the present disclosure (S300) will be described with reference to FIGS. 1 to 3. However, for the sake of simplification of the present disclosure, descriptions overlapping those of FIGS. 1 to 2C will be omitted.

First, referring to FIGS. 1 to 3, the method of changing deceleration of a braking curve based on a variation in a coefficient of friction according to an exemplary embodiment of the present disclosure (S300) may be initiated by an operation of calculating a first coefficient of friction between a brake disk and a friction material in a coefficient-of-friction calculating unit 111 (S301).

Thereafter, the coefficient-of-friction calculating unit 111 may determine whether a preset driving distance has elapsed from a first point in time at which a first coefficient of friction is calculated (S302). When the preset driving distance has elapsed from the first point in time, the method may proceed by an operation of S303.

Thereafter, the coefficient-of-friction calculating unit 111 may calculate a second coefficient of friction between a brake disc and a friction material at a second point in time when a preset driving distance has elapsed from the first point in time (S303).

The above-described first point in time may be a point in time at which a driving distance is a preset distance, for example, 100 km, and the above-described second point in time may be a point in time at which a driving distance is 5000 km. It should be noted that the above-described specific values of the driving distances described above are only for helping understanding of the present disclosure, and the present disclosure is not limited to the above-described specific values.

As described above, the first coefficient of friction and the second coefficient of friction may be calculated according to Equation 1 described above.

According to an exemplary embodiment of the present disclosure, as described above, the coefficient-of-friction calculating unit 111 may calculate a plurality of first coefficients of friction and a plurality of second coefficients of friction when braking by a preset number of braking operations at a preset initial braking speed.

Alternatively, according to an exemplary embodiment of the present disclosure, the coefficient-of-friction calculating unit 111 can calculate a plurality of first coefficients of friction and a plurality of second coefficients of friction after being braked by a preset number of braking operations, as described above.

Next, the determination unit 112 may determine whether there is a variation in a coefficient of friction from a first coefficient of friction and a second coefficient of friction (S304). If it is determined that there is a variation in the coefficient of friction, the method may proceed by an operation of S305.

According to an exemplary embodiment of the present disclosure, the determination unit 112 may determine whether there is a variation in a coefficient of friction based on homogeneity of normal distributions of a plurality of first coefficients of friction and a plurality of second coefficients of friction, or that there is a variation in a coefficient of friction when an average value of the plurality of first coefficients of friction and an average value of the plurality of second coefficients of friction is greater than a preset value, as described above.

Thereafter, the deceleration changing unit 113 may change deceleration by regenerative braking or deceleration by hydraulic braking from a preset braking curve by an amount equal to a variation in deceleration according to the variation in the coefficient of friction (S305). The braking curve in which the deceleration is changed may be stored in the memory 3.

Here, the amount equal to a variation in deceleration may be a difference between deceleration measured at a first point in time and deceleration measured at a second point in time. As described above, when the coefficient of friction is measured a plurality of times, it may be a difference between an average value of a plurality of decelerations measured at the first point in time and an average value of a plurality of decelerations measured at the second point in time.

In addition, according to an exemplary embodiment of the present disclosure, when the preset braking curve comprises a sum of the deceleration by hydraulic braking and the deceleration by regenerative braking compared to a stroke of a brake pedal, the deceleration changing unit 113 may change the deceleration by regenerative braking from the preset braking curve by the amount equal to a variation in deceleration according to the variation in the coefficient of friction, as described above.

In addition, according to an exemplary embodiment of the present disclosure, when the preset braking curve comprises only the deceleration by hydraulic braking compared to the stroke of the brake pedal, the deceleration changing unit 113 may change the deceleration of the preset braking curve by the amount equal to a variation in deceleration according to the variation in the coefficient of friction, as described above.

Meanwhile, according to an exemplary embodiment of the present disclosure, the determination unit 112 may notify a driver that a brake disk needs to be replaced by at least one of an acoustic and a visual method (S306). For example, as described above, a voice or a text saying "Disk nitride layer is worn, please replace".

As described above, according to an exemplary embodiment of the present disclosure, when there is a variation in the coefficient of friction, by changing the deceleration by regenerative braking or the deceleration by hydraulic braking from the preset braking curve by the amount equal to a variation in deceleration according to the variation in the coefficient of friction, the vehicle may be braked at a constant deceleration for the same stroke in spite of the variation in the coefficient of friction.

Figure 4:
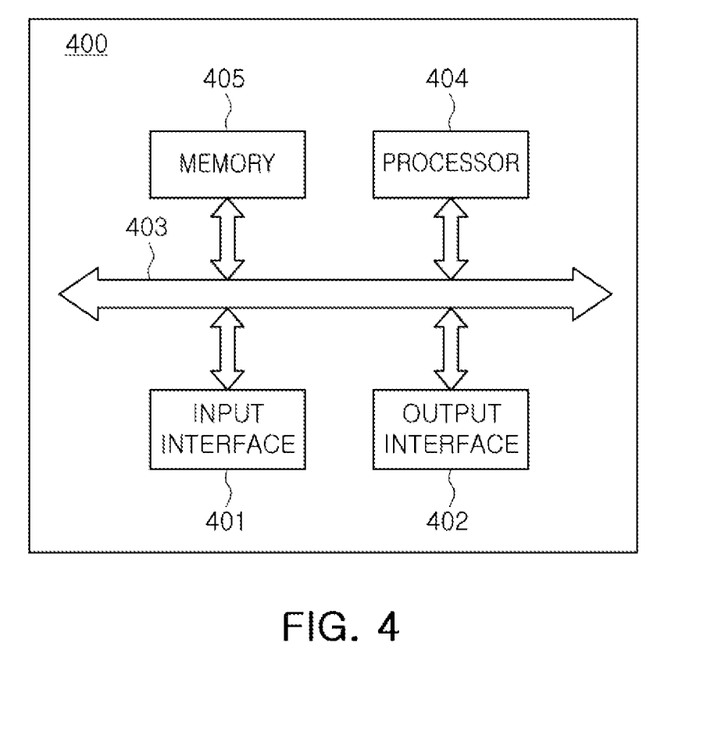
FIG. 4 is a block diagram of a computer device capable of fully or partially implementing the apparatus for changing deceleration of a braking curve according to an exemplary embodiment of the present disclosure.

Meanwhile, FIG. 4 is a block diagram of a computer device that can fully or partially implement an apparatus for changing deceleration of a braking curve according to an exemplary embodiment of the present disclosure, and may be applied to the apparatus for changing deceleration of the braking curve 110 illustrated in FIG. 1.

As illustrated in FIG. 4, the computer device 400 may include an input interface 401, an output interface 402, a processor 404, and a memory 405, and the input interface 401, the output interface 402, the processor 404, and the memory 405 may be interconnected via a system bus 403.

In an exemplary embodiment of the present disclosure, the apparatus for changing deceleration 110 may include the processor 404 and the memory 405 that is used to store a program, an instruction or a code which, when executed by the processor 404, may provide the functionalities of the coefficient-of-friction calculating unit 111, the determination unit, and the deceleration changing unit 113, control the input interface 401 to receive a signal, and control the output interface 402 to transmit a signal. The above-described memory 405 may include read-only memory and random access memory, and may provide instructions and data to the processor 404. Herein, the memory 405 and the processor 404 may be implemented as separate semiconductor circuits. Alternatively, the memory 405 and the processor 404 may be implemented as a single integrated semiconductor circuit. The processor 404 may embody one or more processor(s).

In an exemplary embodiment of the present disclosure, it should be understood that the processor 404 may be a central processing unit (CPU), and may be another general-purpose processor, a digital signal processor (DSP), or an application specific integrated circuit (ASIC), a field programmable gate array (FPGA) or other programmable logic device, discrete gate or transistor logic device, discrete hardware component, or the like. The general-purpose processor may be a microprocessor, or the processor may be any conventional processor, or the like. The above-described processor 404 may perform an operation of the apparatus of changing the deceleration 110 of the above-described braking curve.

In one implementation process, the method of FIG. 3 may be achieved by an integrated logic circuit of hardware in the processor 404 or an instruction in a form of software. The contents of the method disclosed in relation to an exemplary embodiment of the present disclosure may be implemented to be performed and completed by a hardware processor, or may be performed and completed by a combination of hardware and software modules of the processor. The software module may be disposed in a storage medium such as random access memory, flash memory, read-only memory, programmable read-only memory or electrically erasable programmable memory, registers, and the like. The storage medium is located in the memory 405, and the processor 404 reads information from the memory 405 and implements the contents of the above-described method in combination with hardware. In order to avoid duplication, detailed descriptions are omitted herein.

As set forth above, according to an exemplary embodiment of the present disclosure, by changing deceleration by regenerative braking or deceleration by hydraulic braking from preset braking curve by an amount equal to a variation in deceleration according to a variation in a coefficient of friction, when there is a variation in a coefficient of friction, a vehicle may be braked at a constant deceleration for the same stroke despite the variation of While the example embodiments have been illustrated and described above, it will be apparent to those skilled in the art that modifications and variations could be made without departing from the scope of the present disclosure as defined by the appended claims.

What is claimed is:

1. An apparatus of changing deceleration of a braking curve based on a variation in a coefficient of friction, comprising:
   a coefficient-of-friction calculating unit for calculating a first coefficient of friction between a brake disk and a friction material at a first point in time, and calculating a second coefficient of friction between the brake disk and the friction material at a second point in time at which a preset driving distance has elapsed from the first point in time;
   a determination unit for determining whether there is a variation in a coefficient of friction from the first coefficient of friction and the second coefficient of friction; and
   a deceleration changing unit for changing deceleration by regenerative braking or deceleration by hydraulic braking from a preset braking curve by an amount equal to a variation in deceleration according to the variation in the coefficient of friction, when the determination unit determines that there is a variation in the coefficient of friction.

2. The apparatus of claim 1, wherein the first coefficient of friction and the second coefficient of friction are calculated by the following equation, $$\mu = \frac{M \times a}{P \times S \times 2 \times \left(\frac{R1}{R2}\right)}$$

where 'µ' is the first coefficient of friction or the second coefficient of friction, 'M' is a weight of a vehicle, 'a' is a deceleration, 'P' is a pressure of a master cylinder, 'S' is an area of a friction material, 'R1' is an effective radius of a tire, and 'R2' is a dynamic radius of the tire.

3. The apparatus of claim 1, wherein the coefficient-of-friction calculating unit is configured to calculate a plurality of first coefficients of friction and a plurality of second coefficients of friction when braking by a preset number of braking operations at a preset initial braking speed.

4. The apparatus of claim 3, wherein the determination unit determines whether there is a variation in a coefficient of friction based on homogeneity of normal distributions of the plurality of first coefficients of friction and the plurality of second coefficients of friction.

5. The apparatus of claim 3, wherein the determination unit determines whether there is a variation in the coefficient of friction when a difference between an average value of the plurality of first coefficients of friction and an average value of the plurality of second coefficients of friction is greater than a preset value.

6. The apparatus of claim 3, wherein the coefficient-of-friction calculating unit calculates the plurality of first coefficients of friction and the plurality of second coefficients of friction after being braked for a preset number of pre-braking operations.

7. The apparatus of claim 1, wherein the preset braking curve comprises a sum of the deceleration by hydraulic braking and the deceleration by regenerative braking compared to a stroke of a brake pedal, and
   wherein the deceleration changing unit changes the deceleration by regenerative braking from the preset braking curve by the amount equal to the variation in deceleration according to the variation in the coefficient of friction.

8. The apparatus of claim 1, wherein the preset braking curve includes only the deceleration by hydraulic braking compared to a stroke of a brake pedal, and
   wherein the deceleration changing unit is configured to change a deceleration value of the preset braking curve by the amount equal to the variation in deceleration according to the variation in the coefficient of friction.

9. The apparatus of claim 1, wherein temperature deviation and rainfall deviation at the first point in time at which the first coefficient of friction is calculated and the second point in time at which the second coefficient of friction is calculated, is a value within a preset range.

10. The apparatus of claim 1, wherein the brake disk has a surface, the surface of which being nitride-treated.

11. A method of changing deceleration of a braking curve based on a variation in a coefficient of friction, comprising:
    a first operation of calculating, by a coefficient-of-friction calculating unit, a first coefficient of friction between a brake disk and a friction material at a first point in time;
    a second operation of calculating, by the coefficient-of-friction calculating unit, a second coefficient of friction between the brake disk and the friction material at a second point in time at which a preset driving distance has elapsed from the first point in time;
    a third operation of determining, by a determination unit, whether there is a variation in a coefficient of friction between the first coefficient of friction and the second coefficient of friction; and
    a fourth operation of changing, by a deceleration changing unit, deceleration by regenerative braking or deceleration by hydraulic braking from a preset braking curve by an amount equal to a variation in deceleration according to the variation in the coefficient of friction, when there is a variation in the coefficient of friction in the third operation.

12. The method of claim 11,
    wherein the first coefficient of friction and the second coefficient of friction are calculated according to the following equation:

$$\mu = \frac{M \times a}{P \times S \times 2 \times \left(\frac{R1}{R2}\right)}$$

where 'μ' is a first coefficient of friction or a second coefficient of friction, 'M' is a weight of a vehicle, 'a' is deceleration, 'P' is a pressure of a master cylinder, 'S' is an area of a friction material, 'R1' is an effective radius of a tire, and 'R2' is a dynamic radius of the tire.

13. The method of claim 11, wherein, in the first operation, a plurality of first coefficients of friction are calculated when braking by a preset number of braking operations at a preset initial braking speed, and in the second operation, a plurality of second coefficients of friction are calculated when braking by the preset number of braking operations at the preset initial braking speed.

14. The method of claim 13, wherein the third operation includes determining whether there is a variation in a coefficient of friction based on homogeneity of normal distributions of the plurality of first coefficients of friction and the plurality of second coefficients of friction.

15. The method of claim 13, wherein the third operation includes determining that there is a variation in a coefficient of friction when a difference between an average value of the plurality of first coefficients of friction and an average of the plurality of second coefficients of friction is greater than a preset value.

16. The method of claim 13, wherein the first operation and the second operation are performed after being braked by a preset number of pre-braking operations.

17. The method of claim 11, wherein the preset braking curve comprises a sum of the deceleration by hydraulic braking and the deceleration by regenerative braking compared to a stroke of a brake pedal, and wherein the fourth operation includes changing the deceleration by regenerative braking from the preset braking curve by the amount of the variation in deceleration according to the variation in the coefficient of friction.

18. The method of claim 11, wherein the preset braking curve includes only the deceleration by hydraulic braking compared to a stroke of a brake pedal, and wherein the fourth operation includes changing a deceleration value of the preset braking curve is changed by the amount of the variation in deceleration according to the variation in the coefficient of friction.

19. The method of claim 11, wherein temperature deviation and rainfall deviation at the first point in time at which the first coefficient of friction is calculated and the second point in time at which the second coefficient of friction is calculated is a value within a preset range.

20. The method of claim 11, wherein the brake disk has a surface, the surface of which being nitride-treated.

\* \* \* \* \*